US012684377B2

(12) United States Patent
Guo et al.

(10) Patent No.: US 12,684,377 B2
(45) Date of Patent: Jul. 14, 2026

(54) CONTROL CHANNEL MONITORING PROCEDURE

(71) Applicant: ZTE Corporation, Shenzhen (CN)

(72) Inventors: Qiujin Guo, Shenzhen (CN); Xiaoying Ma, Shenzhen (CN); Mengzhu Chen, Shenzhen (CN); Jun Xu, Shenzhen (CN); Focai Peng, Shenzhen (CN); Xuan Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 383 days.

(21) Appl. No.: 18/059,156

(22) Filed: Nov. 28, 2022

(65) Prior Publication Data

US 2023/0087310 A1 Mar. 23, 2023

Related U.S. Application Data

(63) Continuation of application No. PCT/CN2020/093198, filed on May 29, 2020.

(51) Int. Cl.
*H04W 24/08* (2009.01)

(52) U.S. Cl.
CPC .................................. *H04W 24/08* (2013.01)

(58) Field of Classification Search
CPC .................................................... H04W 24/08
See application file for complete search history.

(56) References Cited

U.S. PATENT DOCUMENTS

| | | | | | |
|---|---|---|---|---|---|
| 11,291,025 | B2 * | 3/2022 | Sun | ........................ | H04W 72/23 |
| 11,330,575 | B2 * | 5/2022 | Lin | ........................ | H04L 1/0026 |
| 12,047,880 | B2 * | 7/2024 | Li | ........................ | H04W 52/0235 |
| 12,082,203 | B2 | 9/2024 | Jiang et al. | | |
| 12,137,460 | B2 * | 11/2024 | El Hamss | .............. | H04W 72/23 |
| 2020/0229092 | A1 * | 7/2020 | Wu | ........................ | H04W 76/28 |
| 2020/0367080 | A1 * | 11/2020 | Salah | ................ | H04W 72/1273 |
| 2020/0389874 | A1 * | 12/2020 | Lin | ........................ | H04L 5/0096 |
| 2021/0050936 | A1 | 2/2021 | Seo et al. | | |
| 2021/0051698 | A1 * | 2/2021 | Tsai | ........................ | H04W 72/23 |
| 2021/0120577 | A1 * | 4/2021 | Jiang | ........................ | H04W 72/23 |
| 2021/0144798 | A1 | 5/2021 | Jiang et al. | | |
| 2021/0168715 | A1 * | 6/2021 | Huang | .............. | H04W 72/0446 |

(Continued)

FOREIGN PATENT DOCUMENTS

| | | |
|---|---|---|
| CN | 110719645 A | 1/2020 |
| CN | 110740025 A | 1/2020 |

(Continued)

OTHER PUBLICATIONS

Asustek, "Wake up indication for ON duration timer," 3GPP TSG RAN WG1 #101, e-Meeting, R1-2004320, 3 pages, May 25-Jun. 5, 2020.

(Continued)

*Primary Examiner* — Parth Patel
(74) *Attorney, Agent, or Firm* — Perkins Coie

(57) ABSTRACT

Methods, systems and apparatus for wireless communication are described. One example method of wireless communication includes selecting, by a wireless device, a monitoring behavior for monitoring a control channel. The method further includes, monitoring, by the wireless device, the control channel according to the monitoring behavior. The monitoring behavior may include a skipping operation during which monitoring is disabled.

17 Claims, 5 Drawing Sheets

(56)                  References Cited

U.S. PATENT DOCUMENTS

| | | | | |
|---|---|---|---|---|
| 2021/0211237 A1* | 7/2021 | Yang | H04L 1/1614 |
| 2021/0250153 A1* | 8/2021 | Lin | H04W 72/23 |
| 2021/0266909 A1* | 8/2021 | Lin | H04L 5/0053 |
| 2021/0368368 A1* | 11/2021 | He | H04L 5/001 |
| 2022/0132342 A1* | 4/2022 | Kim | H04L 5/0053 |
| 2022/0256462 A1* | 8/2022 | Li | H04W 76/15 |
| 2022/0279557 A1* | 9/2022 | Li | H04L 5/0098 |
| 2022/0322118 A1* | 10/2022 | Kim | H04W 24/08 |
| 2022/0338123 A1* | 10/2022 | Xu | H04L 5/0053 |
| 2022/0345921 A1* | 10/2022 | Liu | H04L 5/0053 |
| 2022/0386373 A1* | 12/2022 | Thyagarajan | H04W 24/08 |
| 2022/0394520 A1* | 12/2022 | Shokri Razaghi | H04W 74/0866 |
| 2022/0394751 A1* | 12/2022 | Myung | H04L 5/00 |
| 2023/0022171 A1* | 1/2023 | Luo | H04W 52/0219 |
| 2023/0087310 A1* | 3/2023 | Guo | H04W 52/0216 370/252 |
| 2023/0119439 A1* | 4/2023 | Kim | H04L 27/26025 370/329 |
| 2023/0156572 A1* | 5/2023 | Reial | H04W 72/23 370/329 |
| 2023/0413087 A1* | 12/2023 | He | H04W 24/08 |
| 2024/0107556 A1* | 3/2024 | Ma | H04W 24/02 |
| 2024/0205934 A1* | 6/2024 | Zhou | H04L 1/1864 |

FOREIGN PATENT DOCUMENTS

| | | | |
|---|---|---|---|
| CN | 111148125 A | 5/2020 |
| WO | 2019216640 A1 | 11/2019 |
| WO | 2020011180 A1 | 1/2020 |
| WO | 2020034440 A1 | 2/2020 |
| WO | 2020092865 A1 | 5/2020 |

OTHER PUBLICATIONS

International Search Report and Written Opinion for International Application No. PCT/CN2020/093198, mailed on Feb. 24, 2021 (6 pages).

Extended European Search Report for European Patent Application No. 20896819.8, mailed Jun. 30, 2023 (13 pages).

Qualcomm Inc., "PDCCH-based power saving channel design," 3GPP TSG-RAN WG1 #99, R1-1912970, Reno, USA, Nov. 18-22, 2019 (19 pages).

Huawei et al., "Corrections on PDCCH/GC-PDCCH monitoring procedure in TS38.213," 3GPP TSG RAN WG1 Meeting #100-e, R1-2000195, Feb. 24-Mar. 6, 2020 (14 pages).

"LENOVO (Moderator), ""Summary of email discussion [100b-e-NR-unlic-NRUDL_Signals_and_Channels-01] on SS group sets,"" 3GPP TSG RAN WG1#100bis-e, R1-2002786, e-Meeting, Apr. 20-30, 2020 (19 pages).".

ZTE, "Views on power saving enhancement," 3GPP TSG RAN WG 1 #100bis, R1-2001586, e-Meeting, Apr. 20-Apr. 30, 2020 (11 pages).

Office Action for Korean Patent Application No. 10-2022-7026478, mailed Mar. 17, 2025 (13 pages).

First Office Action for Chinese Application No. 202080098245.6, mailed Jul. 25, 2025, with English summary and translation, 23 pages.

Communication pursuant to Article 94(3) EPC for European Patent Application No. 20896819.8, mailed Sep. 1, 2025 (6 pages).

* cited by examiner

PDCCH
monitoring
occasions

PDCCH
monitoring
occasions

300

310

Selecting, by a wireless device, a monitoring behavior for monitoring a control channel

320

Monitoring the control channel according to the monitoring behavior

400

410

Transmitting, by a network device, to a wireless device, a monitoring behavior for monitoring a control channel

*FIG. 4*

CONTROL CHANNEL MONITORING PROCEDURE

CROSS REFERENCE TO RELATED APPLICATIONS

This patent document is a continuation of and claims benefit of priority to International Patent Application No. PCT/CN2020/093198, filed on May 29, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meet the needs of various communication scenarios. In comparison with the existing wireless networks, such as LTE wireless networks, next generation systems and wireless communication techniques need to provide support for an increased number of users and devices.

SUMMARY

This document relates to methods, systems, and devices for monitoring schemes for downlink control signals in mobile communication technology, including 5th Generation (5G) and New Radio (NR) communication systems.

In one exemplary aspect, a wireless communication method is disclosed. The method includes selecting, by a wireless device, a monitoring behavior for monitoring a control channel, and monitoring, by the wireless device, the control channel according to the monitoring behavior.

In another exemplary aspect, a wireless communication method is disclosed. The method includes transmitting, by a network device, to a wireless device, a monitoring behavior for monitoring a control channel.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 4 illustrates another example of a process for wireless communication based on some example embodiments of the disclosed technology.

DETAILED DESCRIPTION

Certain features are described using the example of Fifth Generation (5G) wireless protocol. However, applicability of the disclosed techniques is not limited to only 5G wireless systems.

Figure 1A:
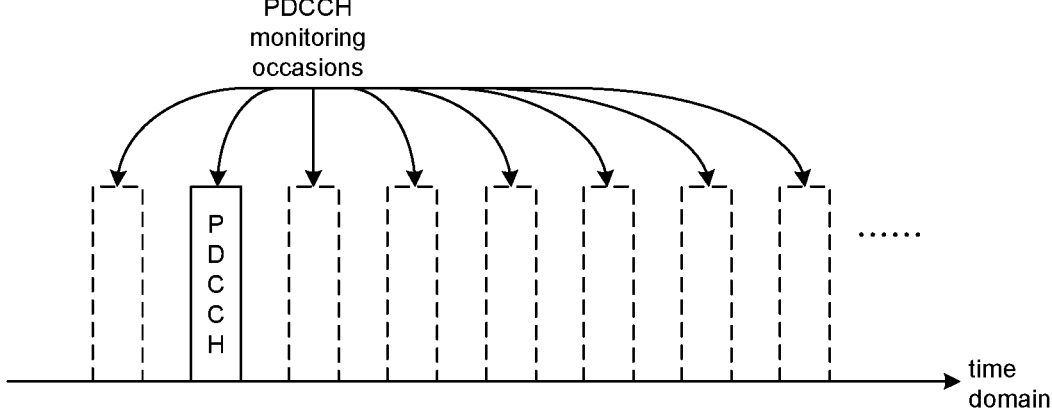
FIGS. 1A and 1B illustrates examples of PDCCH monitoring behaviors.
Figure 1B:
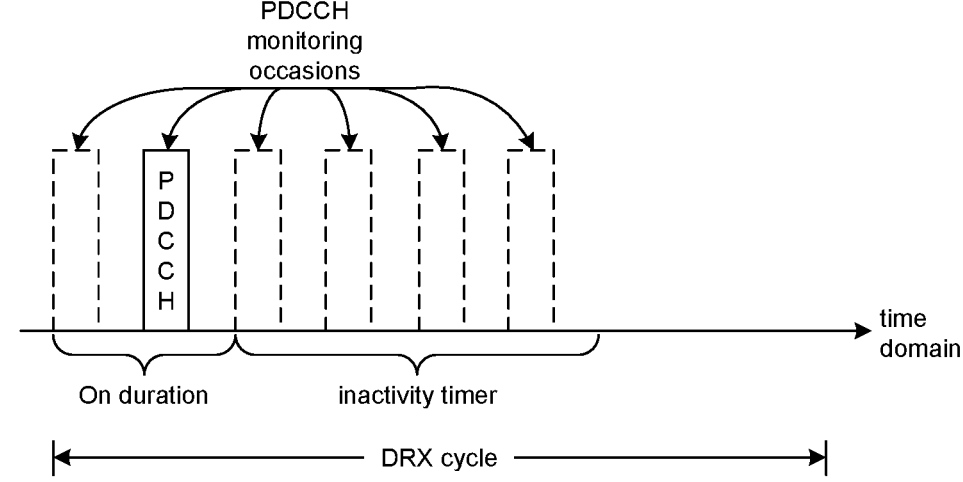

In existing Long-Term Evolution (LTE) and 5G 3GPP New Radio (NR) communication systems, user equipment (UE) determines the resource for a data transmission based on the scheduling information in a physical downlink control channel (PDCCH). The UE needs to keep monitoring the PDCCH in PDCCH monitoring occasions according to the configured search space set(s) to avoid missing any data scheduling information. The PDCCH monitoring occasion is determined by parameters of a periodicity $k_s$, a duration $T_s$ in a periodicity, and an offset $O_s$ associated with a start position of the periodicity. For example, the PDCCH monitoring behavior can include parameters with $T_s=1$ slot and $k_s=2$ slots (shown in FIG. 1A). Inducing the discontinuous reception (DRX) mechanism may ensure the UE avoids some PDCCH monitoring power consumption during the DRX-off period, as shown in the PDCCH monitoring behavior (shown in FIG. 1B). In addition, the wake-up signal, which is used to indicate wake-up or no-wake-up indication, namely, whether the higher layer of the UE starts or not starts the drx-onDuration timer of the next DRX cycle, is induced to ensure the UE avoids PDCCH monitoring in the DRX cycle without data scheduling. However, the PDCCH monitoring operation for the UE also consumes unnecessary power in a DRX Active Time for the sparse traffic model with a DRX configuration, especially for a longer DRX cycle configuration.

Disclosed herein are power saving techniques that can reduce PDCCH monitoring operation by switching or adapting to PDCCH monitoring parameters. Simulation results show that the exemplary power saving techniques can reduce the UE power consumption compared to the legacy PDCCH monitoring method.

Figure 2:
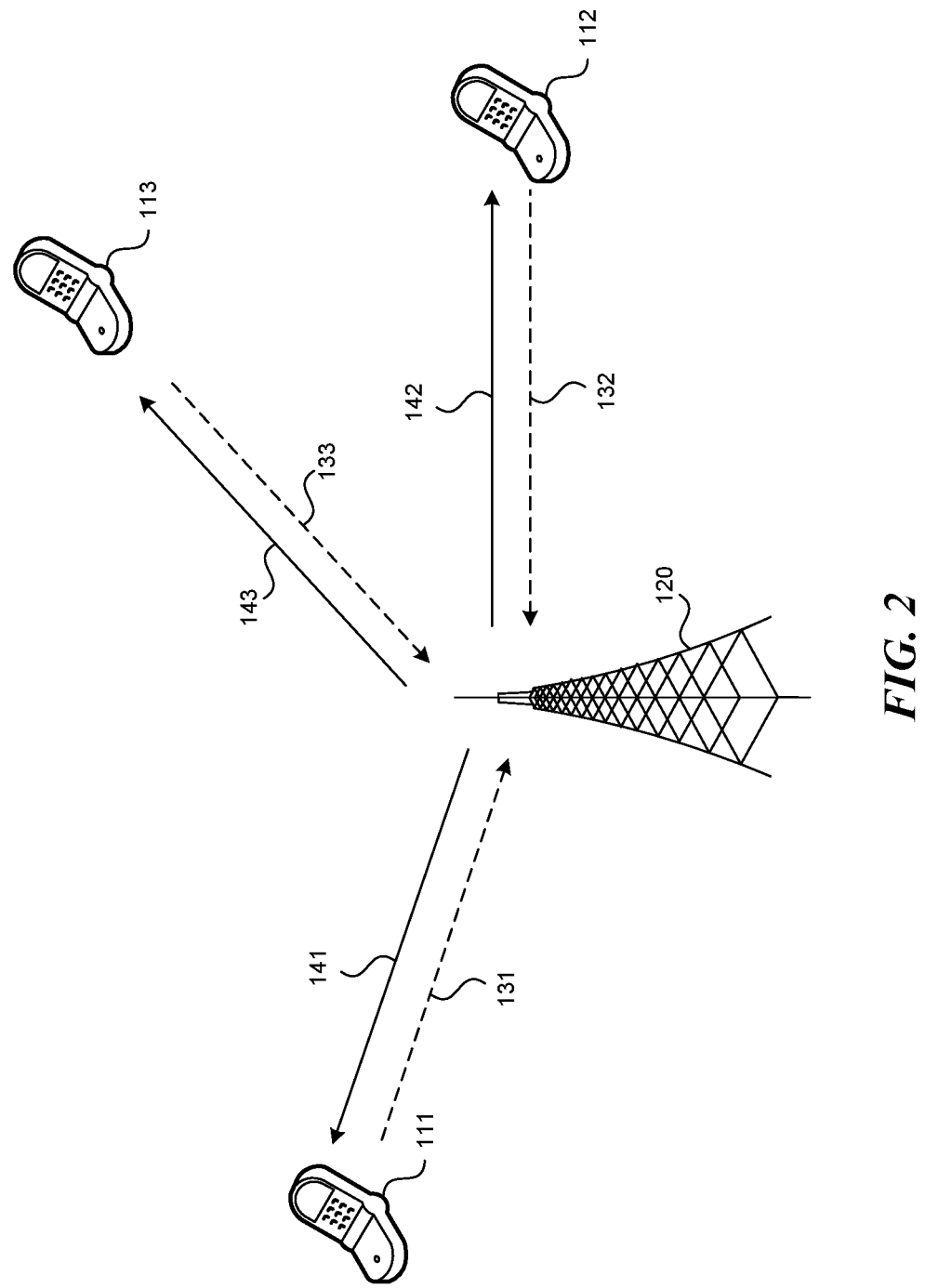
FIG. 2 shows an example of a base station (BS) and user equipment (UE) in wireless communication.

FIG. 2 shows an example of a wireless communication system (e.g., an LTE, 5G or New Radio (NR) cellular network) that includes a BS 120 and one or more user equipment (UE) 111, 112 and 113. In some embodiments, the uplink transmissions (131, 132, 133) include cyclically-shifted base sequences that constitute the mapping scheme for the uplink control transmissions. In some embodiments, the downlink transmission includes monitoring downlink control signaling based on the monitoring schemes and receiving the scheduled data transmissions. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use communication protocols different from the 3GPP protocols.

In one aspect, the CRC for a DCI format is scrambled with at least one of the following: C-RNTI, MCS-C-RNTI, SP-CSI-RNTI, CS-RNTI, and SFI-RNTI.

In another aspect, PDCCH monitoring behavior represents at least one of the following behaviors: PDCCH monitoring according to a search space set, PDCCH monitoring according to search space sets within a group, and PDCCH monitoring according to a list of parameters related to PDCCH monitoring.

In another aspect, PDCCH monitoring behavior transition represents functionality including at least one of the followings: PDCCH monitoring switching between different search space sets, PDCCH monitoring switching between different groups of search space sets, PDCCH monitoring switching between different lists of parameters related to PDCCH monitoring, and PDCCH monitoring switching triggered by a behavior such as applying cross-slot scheduling, a BWP switching behavior, a wake-up or no-wake-up indication, a timer starting and/or restarting and/or a timer expired event.

BRIEF DISCUSSION

In the existing LTE and 5G NR communication systems, the UE needs to know the uplink scheduling grant information for sending physical uplink shared channel (PUSCH) and downlink scheduling allocation information for receiving physical downlink shared channel (PDSCH). The information is included in the downlink control information (DCI) and is sent by the base station to the UE on the PDCCH. The DCI formats are defined to represent a specific use. The CRC of the DCI format can be scrambled by at least one type of RNTI. Therefore, the UE should firstly monitor the PDCCH.

The operation of the UE to monitor the PDCCH may be performed on a control resource set and the PDCCH monitoring occasions according to a search space set associated with the control resource set. The relevant monitoring parameters of the PDCCH are included in the SearchSpace information elements (IE) which is a radio resource control (RRC) signaling, where the searchSpaceId and the controlResourceSetId indicate the search space set index and CORESET index applicable for PDCCH monitoring. The searchSpaceType in SearchSpace IE indicates the search space type of the PDCCH that the UE wants to monitor, that is, the common search space/UE-Specific search space corresponds to different DCI formats or different RNTIs used to scramble the CRC of a DCI to be detected, and the UE-Specific search space contains less DCI formats or less types of RNTIs.

The duration included in the SearchSpace IE is a duration of $T_s < k_s$ indicating the number of slots that the UE monitors a PDCCH in a PDCCH monitoring cycle for search space set s; monitoringSlotPeriodicityAndOffset included in the SearchSpace IE indicates a PDCCH monitoring periodicity or cycle of $k_s$ slots and a PDCCH monitoring offset of $O_s$ slots; monitoringSymbolsWithinSlot indicates the first symbol(s) of the CORESET within a slot for PDCCH monitoring. The specific PDCCH monitoring occasion(s) can be obtained as follows. For search space set s, the UE determines that a PDCCH monitoring occasion(s) exists in a slot with number $$n_{s,f}^{\mu}$$

in a frame with number $n_f$ if $$\left(n_f \cdot N_{slot}^{frame,\mu} + n_{s,f}^{\mu} - o_s\right) \bmod k_s = 0.$$

The UE monitors PDCCH for search space set s for $T_s$ consecutive slots, starting from slot $$n_{s,f}^{\mu},$$

and does not monitor PDCCH for search space set s for the next $k_s - T_s$ consecutive slots.

The existing power saving techniques for 5G NR include the following:

1) wake up indication indicated by DCI format 2-6 can indicate a UE to wake up or not to wake up in the next DRX cycle, namely, indicates the higher layer of a UE to start or not to start the drx-onDuration timer in the next DRX cycle which can reduce PDCCH monitoring power consumption in a DRX cycle;

2) minimum applicable scheduling offset indication indicated by DCI format 0-1/1-1 can indicate a minimum time gap between a PDCCH and a PDSCH or PUSCH scheduled by the PDCCH. For example, the slot offset of PDSCH (K0) is defined as the time gap between the PDCCH and its scheduling PDSCH. The slot offset of PUSCH (K2) is the time gap between the PDCCH and its scheduling PUSCH. It makes UE relax the PDCCH decoding process time to reduce some decoding power consumption; and 3) the indication of dormancy-like behavior transition on one or more secondary cell (Scell) indicated by DCI format 2-6/0-1/1-1 can trigger UE to perform dormancy behavior on some Scells by indicating whether the UE on a SCell to or not to switch to the dormant BWP.

Embodiment 1: PDCCH Monitoring Behavior Transition Functionality

PDCCH monitoring behavior indicated by a signaling can represent whether the UE monitors PDCCH according to a search space set or not. In some embodiments, UE can monitor PDCCH according to the indicated search space set.

PDCCH monitoring behavior indicated by a signaling can represent whether the UE monitors PDCCH according to search spaces sets in a search space set group. In some embodiments, the UE can monitor PDCCH according to the search space sets in the indicated search space set group. The search space set group can include a plurality of search space sets. The first type of DCI format can indicate an index of a search space set group among the list of search space set groups. The number of search space set groups in the list of search space set groups can be M, and the bit width of the field indicating the search space set group in the DCI format can be ceil(log 2(M)).

For example, M can be equal to 2, and the first type of DCI format (e.g., DCI format 2-0) can indicate one bit value of '0' to trigger the UE to monitor PDCCH according to the search space set group 0.

In some embodiments, another PDCCH monitoring behavior based on the PDCCH monitoring behavior indicated by the first type of DCI format can be indicated by a second DCI format. The PDCCH monitoring behavior indicated by the first DCI format can be noted as the first PDCCH monitoring behavior, and the PDCCH monitoring behavior indicated by the second DCI format can be noted as the second PDCCH monitoring behavior.

In some embodiments, the second type of PDCCH monitoring behavior can represent that the UE monitors PDCCH according to a plurality of search space sets in the current search space group. In some embodiments, the search space sets in a search space set group can be divided into a plurality of subgroups based on a threshold associated with the PDCCH monitoring parameters of a search space set. The threshold associated with the PDCCH monitoring parameters of the search space set can be at least one of the following: PDCCH monitoring periodicity ks; PDCCH monitoring offset Os; duration Ts; PDCCH monitoring frequency fs; or the number of monitoring symbols within a slot Nsymb. The unit of the above PDCCH monitoring parameters ks, Os and Ts can be slot. The PDCCH monitoring frequency fs can represent the granularity of the monitoring occasions. In some embodiments, the PDCCH monitoring frequency can be equal to the value of Ts/ks.

In some embodiments, the second type of DCI format can indicate an index of the search space set subgroup among the search space set subgroups in the current search space set group. The UE can monitor PDCCH according to the search space sets in the indicated search space set subgroup other than the other search space sets in the current or the indicated search space set group.

In some embodiments, if the UE is indicated an index of search space set subgroup which is not included in the applied search space group, the UE can assume that the lowest index of the search space set subgroup in the search space set group will be used to determine the subsequent PDCCH monitoring occasions.

In some embodiments, if the UE is indicated an index of search space set subgroup which is not included in the applied search space group, the UE can assume that all of the search space sets in the search space set group will be used to determine the subsequent PDCCH monitoring occasions.

In some embodiments, the second type of DCI format can indicate the value of the threshold. The UE may monitor PDCCH according to the search space sets among the search space sets in the current search space set group, and the PDCCH monitoring parameters of each of the search space sets can be smaller or larger than the indicated threshold.

In some embodiments, the threshold can be indicated for the duration Ts, and the UE may monitor PDCCH according to the search space sets or lists of the PDCCH monitoring parameters satisfied with the duration smaller than the threshold.

In some embodiments, the threshold can be indicated for the PDCCH monitoring periodicity ks, and the UE may monitor PDCCH according to the search space sets or lists of PDCCH monitoring parameters satisfied with the PDCCH monitoring periodicity larger than the threshold.

In some embodiments, the threshold can be indicated for the PDCCH monitoring offset Os, and the UE may monitor PDCCH according to the search space sets or lists of PDCCH monitoring parameters satisfied with the PDCCH monitoring offset larger than the threshold.

In some embodiments, the threshold can be indicated for the number of monitoring symbols in a slot Nsymb, and the UE may monitor PDCCH according to the search space sets or lists of PDCCH monitoring parameters satisfied with the number of monitoring symbols in a slot smaller than the threshold.

In some embodiments, the threshold can be indicated for the PDCCH monitoring frequency fs, and the UE may monitor PDCCH according to the search space sets or lists of PDCCH monitoring parameters satisfied with the PDCCH monitoring frequency smaller than the threshold. In some embodiments, the PDCCH monitoring frequency can represent the value of ks/Ts.

In some embodiments, if no search space set in the search space set group is satisfied with the condition that the value of a PDCCH monitoring parameter is smaller or larger than the indicated threshold corresponding to the PDCCH monitoring parameter, the UE can assume to perform the PDCCH monitoring according to the search space set in a search space set group with a smallest value of the corresponding PDCCH monitoring parameter, e.g., the duration.

In some embodiments, if no search space set in the search space set group is satisfied with the condition that the value of a PDCCH monitoring parameter is smaller than the indicated threshold, the UE can assume to perform PDCCH monitoring according to all of the search space sets in the search space set group.

In some embodiments, the first type of DCI format can include a group common DCI. In some embodiments, the first type of DCI format can include DCI format 2-0. In some embodiments, the second type of DCI format can include a UE-specific DCI. In some embodiments, the second type of DCI format can include at least one of the following: 1) DCI format 0-1, 2) DCI format 0-2, 3) DCI format 1-1, 4) DCI format 1-2, or 5) DCI format 2-0.

The PDCCH monitoring behavior indicated by the first type of DCI format can be used to monitor the PDCCH in common search space and the UE-specific search space. In some embodiments, the PDCCH monitoring behavior indicated by the second type of DCI format can be used to monitor the PDCCH in the UE-specific search space.

Embodiment 2: PDCCH Monitoring Behavior Transition Indicated by a DCI Format Disclosed herein are two exemplary methods for indicating the PDCCH monitoring behavior transition. One method includes reinterpreting indication of one or more fields in a DCI format. Another method includes explicit indication of a new additional field in a DCI format.

Method 2-1: Reinterpreting Indication Information of a DCI Format

For a DCI format with CRC scrambled with a predefined RNTI, if the indication of a plurality of fields in a DCI format is satisfied with a predefined condition, then the UE can determine the PDCCH monitoring behavior based on the indication of the predefined fields. The predefined RNTI may include at least one of the following: C-RNTI, MCS-C-RNTI, or SP-CSI-RNTI.

In some embodiments, the predefined condition can be at least one of the following:

1) all bits of the frequency domain resource assignment field are set to a predefined state;

2) a UL-SCH indicator is "0"; or 3) a CSI request is all zero(s).

The DCI format can be 0-2. If the predefined condition is the above predefined condition (1), then the predefined RNTI can be C-RNTI, MCS-C-RNTI, or SP-CSI-RNTI.

The DCI format can be 0-2. If the predefined condition is the above predefined conditions (2) and (3), then the predefined RNTI can be a C-RNTI, MCS-C-RNTI, or CS-RNTI.

If the predefined condition is the above predefined condition (1), then the predefined fields may include at least one of the following:

1) bandwidth part indicator;
2) time domain resource assignment;
3) downlink assignment index;
4) modulation and coding scheme;
5) new data indicator;
6) redundancy version;
7) HARQ process number;
8) precoding information and number of layers;
9) antenna ports;
10) TPC command for scheduled PUSCH;
11) PTRS-DMRS association;
12) priority indicator; or
13) invalid symbol pattern indicator.

If the predefined condition is the above predefined conditions (2) and (3), then the predefined fields may include at least one of the following:

1) bandwidth part indicator;
2) frequency domain resource assignment;
3) time domain resource assignment;
4) modulation and coding scheme;
5) new data indicator;
6) redundancy version;
7) HARQ process number;
8) downlink assignment index;
9) precoding information and number of layers;
10) antenna ports;
14) TPC command for scheduled PUSCH;
15) PTRS-DMRS association;
11) DMRS sequence initialization;
12) priority indicator;
13) invalid symbol pattern indicator; or
14) SCell dormancy indication.

EXAMPLE 2-1

For example, if:

1) a UE monitors PDCCH according to a search space set for detection of DCI format 0_2;
2) the CRC of DCI format 1_1 is scrambled by a C-RNTI, MCS-C-RNTI, or CS-RNTI;
3) UL-SCH indicator is "0"; and
4) CSI request are all "0", then the UE considers a plurality of fields in DCI format 0_2 as the fields indicating PDCCH monitoring behavior; namely, the fields are not used to schedule a PDSCH transmission, or indicate a SPS PDSCH release or an invalid/unexpected indication. Further, the UE can interpret the sequence of fields of modulation and coding scheme, new data indicator redundancy version, HARQ process number, and/or antenna ports as providing a bitmap to each configured set of one or more PDCCH monitoring parameters, in an ascending order of the parameter set index, where a '0' value for a bit of the bitmap indicates a set of one or more PDCCH monitoring parameters with a corresponding index. Further, the UE may not monitor PDCCH according to the set of one or more PDCCH monitoring parameters. For a serving cell, a '1' value for a bit of the bitmap can indicate a set of one or more PDCCH monitoring parameters with a corresponding index, and the UE can monitor PDCCH according to the set of one or more PDCCH monitoring parameters, wherein the DL BWP can be the active DL BWP for the serving Cell.

EXAMPLE 2-2

In another example, if:

1) a UE monitors PDCCH according to a search space set for detection of DCI format 0_2;
2) the CRC of DCI format 1_1 is scrambled by a C-RNTI, MCS-C-RNTI, or SP-CSI-RNTI; and
3) resourceAllocation=resourceAllocationType0 and all bits of the frequency domain resource assignment field in DCI format 0_2 are equal to 0, resourceAllocation=resourceAllocationType1 and all bits of the frequency domain resource assignment field in DCI format 0_2 are equal to 1, or resourceAllocation=dynamicSwitch and all bits of the frequency domain resource assignment field in DCI format 0_2 are equal to 0 or 1, then the UE can consider some or all of the fields in the DCI format 0_2 as the fields indicating PDCCH monitoring behavior. For example, the UE may consider that the fields are not used to schedule a PDSCH transmission or to indicate an SPS PDSCH release or an invalid/unexpected indication, but the UE may interpret the sequence of fields of modulation and coding scheme, new data indicator, redundancy version, HARQ process number, and/or antenna ports as providing a bitmap to each configured set of PDCCH monitoring parameter(s), in an ascending order of the parameter set index, where a '0' value for a bit of the bitmap indicates a set of one or more PDCCH monitoring parameter with the corresponding index. Further, the UE may not monitor PDCCH according to the set of one or more PDCCH monitoring parameters. Further, for a serving Cell, a '1' value for a bit of the bitmap can indicate a set of one or more PDCCH monitoring parameters with a corresponding index, and the UE may monitor PDCCH according to the set of PDCCH monitoring parameter(s), wherein the DL BWP can be the active DL BWP for a serving Cell.

In some embodiments, the DCI format can be DCI format 0-1.

In some embodiments, the predefined RNTI can be a C-RNTI, MCS-C-RNTI, SP-CSI-RNTI if the predefined condition is the above predefined condition (1).

In some embodiments, the predefined RNTI is a C-RNTI, MCS-C-RNTI, or CS-RNTI if the predefined condition is the above predefined conditions (2) and (3).

In some embodiments, if the predefined condition is the above predefined condition (1), the predefined fields can include at least one of the following:

1) bandwidth part indicator;
2) HARQ-ACK bitmap;
3) time domain resource assignment;
4) frequency hopping flag;
5) modulation and coding scheme;
6) new data indicator;
7) redundancy version;
8) HARQ process number;
9) $1^{st}$ downlink assignment index;
10) $2^{nd}$ downlink assignment index;
11) precoding information and number of layers;
12) antenna ports;
13) DMRS sequence initialization;
14) CBG transmission information (CBGTI); or
15) priority indicator;

In some embodiments, if the predefined condition is the above predefined conditions (2) and (3), the predefined fields can include at least one of the following:

1) bandwidth part indicator;
2) HARQ-ACK bitmap;
3) frequency domain resource assignment;
4) time domain resource assignment;
5) modulation and coding scheme;
6) new data indicator;
7) redundancy version;
8) HARQ process number;
9) $1^{st}$ downlink assignment index;
10) $2^{nd}$ downlink assignment index;
11) precoding information and number of layers;
12) antenna ports;
13) DMRS sequence initialization;
14) CBG transmission information (CBGTI);
15) priority indicator; or
16) SCell dormancy indication.

EXAMPLE 2-3

For example, if:

1) a UE monitors PDCCH according to a search space set for detection of DCI format 0_1;
2) the CRC of DCI format 0_1 is scrambled by a C-RNTI, MCS-C-RNTI, or CS-RNTI;
3) a UL-SCH indicator is "0"; and
4) a CSI request is all "0"(s), then the UE considers a plurality of fields in the DCI format 0_1 as the fields indicating PDCCH monitoring behavior; namely, the fields are not used to schedule a PDSCH transmission or indicate a SPS PDSCH release or an invalid or unexpected indication, and the UE interprets the sequence of fields of modulation and coding scheme as providing a bitmap to each configured set of PDCCH monitoring parameter(s), in an ascending order of the parameter set index, where:

a) a '0' value for a bit of the bitmap indicates a set of PDCCH monitoring parameter(s) with the corresponding index, and the UE will not monitor the PDCCH according to the set of PDCCH monitoring parameter(s) for a serving Cell, and b) a '1' value for a bit of the bitmap indicates a set of PDCCH monitoring parameter(s) with the corresponding index, and the UE will monitor the PDCCH according to the set of PDCCH monitoring parameter(s) for a serving Cell.

In some embodiments, the DL BWP can be the active DL BWP for a serving Cell.

EXAMPLE 2-4

For example, if:

1) a UE monitors PDCCH according to a search space set for detection of DCI format 0_1;
2) the CRC of DCI format 0_1 is scrambled by a C-RNTI, MCS-C-RNTI, or SP-CSI-RNTI; and
3) resourceAllocation=resourceAllocationType0 and all bits of the frequency domain resource assignment field in DCI format 0_1 are equal to 0, resourceAllocation=resourceAllocationType1 and all bits of the frequency domain resource assignment field in DCI format 0_1 are equal to 1, or resourceAllocation=dynamicSwitch and all bits of the frequency domain resource assignment field in DCI format 0_1 are equal to 0 or 1, then the UE can consider a plurality of fields in the DCI format 0_1 as the fields indicating PDCCH monitoring behavior; namely, the fields are not used to schedule a PDSCH reception or indicate a SPS PDSCH release or an invalid/unexpected indication, and the UE can interpret the sequence of fields of modulation and coding scheme as providing a bitmap to each configured set of PDCCH monitoring parameter(s), in an ascending order of the parameter set index, where:

a) a '0' value for a bit of the bitmap indicates a set of PDCCH monitoring parameter(s) with the corresponding index, and the UE will not monitor the PDCCH according to the set of PDCCH monitoring parameter(s) for a serving Cell, and b) a '1' value for a bit of the bitmap indicates a set of PDCCH monitoring parameter(s) with the corresponding index, and the UE will monitor the PDCCH according to the set of PDCCH monitoring parameter(s), for a serving Cell.

In some embodiments, the DL BWP can be the active DL BWP for a serving Cell.

In some embodiments, the DCI format can be DCI format 1-2.

In some embodiments, the predefined RNTI can be a C-RNTI, MCS-C-RNTI, or CS-RNTI if the predefined condition is the above predefined condition (1).

In some embodiments, if the predefined condition is the above predefined condition (1), the predefined fields include at least one of the followings:

1) bandwidth part indicator;
2) time domain resource assignment;
3) modulation and coding scheme;
4) new data indicator;
5) redundancy version;
6) HARQ process number;
7) downlink assignment index;
8) antenna port(s);
9) transmission configuration indication;
10) DMRS sequence initialization; or
11) priority indicator.

EXAMPLE 2-5

For example, if:

1) a UE monitors PDCCH according to a search space set for detection of DCI format 1_2;
2) the CRC of DCI format 1_2 is scrambled by a C-RNTI, MCS-C-RNTI, or CS-RNTI; and
3) resourceAllocation=resourceAllocationType0 and all bits of the frequency domain resource assignment field in DCI format 1_2 are equal to 0, resourceAllocation=resourceAllocationType1 and all bits of the frequency domain resource assignment field in DCI format 1_2 are equal to 1, or resourceAllocation=dynamicSwitch and all bits of the frequency domain resource assignment field in DCI format 1_2 are equal to 0 or 1, then the UE can consider the DCI format 1_2 as indicating PDCCH monitoring behavior, not scheduling a PDSCH reception or indicating a SPS PDSCH release or an invalid/unexpected indication, and the UE can interpret the sequence of fields of modulation and coding scheme as providing a bitmap to each configured set of PDCCH monitoring parameter(s), in an ascending order of the parameter set index, where:

a) a '0' value for a bit of the bitmap indicates a set of PDCCH monitoring parameter(s) with the corresponding index, and the UE will not monitor PDCCH according to the set of PDCCH monitoring parameter(s) for a serving Cell, and b) a '1' value for a bit of the bitmap indicates a set of PDCCH monitoring parameter(s) with the corresponding index, and the UE will monitor PDCCH according to the set of PDCCH monitoring parameter(s) for a serving Cell.

In some embodiments, the DL BWP can be the active DL BWP for a serving Cell.

In some embodiments, the DCI format can be DCI format 1-1.

In some embodiments, the predefined RNTI can be a C-RNTI, MCS-C-RNTI, or CS-RNTI, if the predefined condition is the above predefined condition (1).

In some embodiments, if the predefined condition is the above predefined condition (1), the predefined fields can include at least one of the following:

1) bandwidth part indicator;

2) time domain resource assignment;

3) modulation and coding scheme of transport block 2;

4) new data indicator of transport block 2;

5) redundancy version of transport block 2;

6) HARQ process number;

7) downlink assignment index;

8) PDSCH group index;

9) new feedback indicator;

10) number of requested PDSCH group(s);

11) antenna port(s);

12) CBG transmission information (CBGTI);

13) CBG flushing out information (CBGFI);

14) DMRS sequence initialization;

15) priority indicator; or 16) minimum applicable scheduling offset indicator.

In some embodiments, the DCI format can be DCI format 1-1.

In some embodiments, the predefined RNTI can be a C-RNTI, MCS-C-RNTI, or CS-RNTI if the predefined condition is the above predefined condition (1) and all bits of the fields, modulation and coding scheme, new data indicator and redundancy version of transport block 2 are set to predefined states.

In some embodiments, if the predefined condition is the above predefined conditions (1) and all bits of the fields, modulation and coding scheme, new data indicator and redundancy version of transport block 2 are set to predefined states, the predefined fields can include at least one of the following:

1) bandwidth part indicator;

2) time domain resource assignment;

3) modulation and coding scheme of transport block 1;

4) new data indicator of transport block 1;

5) redundancy version of transport block 1;

6) HARQ process number;

7) downlink assignment index;

8) PDSCH group index;

9) new feedback indicator;

10) number of requested PDSCH group(s);

11) antenna port(s);

12) CBG transmission information (CBGTI);

13) CBG flushing out information (CBGFI);

14) DMRS sequence initialization;

15) priority indicator;

16) minimum applicable scheduling offset indicator; or

17) SCell dormancy indication.

EXAMPLE 2-6

For example, if:

1) a UE monitors PDCCH according to a search space set for detection of DCI format 1_1;

2) the CRC of DCI format 1_1 is scrambled by a C-RNTI, MCS-C-RNTI, or CS-RNTI; and 3) resourceAllocation=resourceAllocationType0 and all bits of the frequency domain resource assignment field in DCI format 1_1 are equal to 0, resourceAllocation=resourceAllocationType1 and all bits of the frequency domain resource assignment field in DCI format 1_1 are equal to 1, or resourceAllocation=dynamicSwitch and all bits of the frequency domain resource assignment field in DCI format 1_1 are equal to 0 or 1, then the UE can consider the DCI format 1_1 as indicating PDCCH monitoring behavior, not scheduling a PDSCH reception or indicating a SPS PDSCH release or an invalid/unexpected indication, and the UE can interpret the sequence of fields of time domain resource assignment as providing a bitmap to each configured set of PDCCH monitoring parameter(s), in an ascending order of the parameter set index, where:

a) a '0' value for a bit of the bitmap indicates a set of PDCCH monitoring parameter(s) with the corresponding index, and the UE will not monitor the PDCCH according to the set of PDCCH monitoring parameter(s) for a serving Cell, and b) a '1' value for a bit of the bitmap indicates a set of PDCCH monitoring parameter(s) with the corresponding index, and the UE will monitor PDCCH according to the set of PDCCH monitoring parameter(s) for a serving Cell.

In some embodiments, the DL BWP can be the active DL BWP for a serving Cell.

For SCell dormancy behavior indication, if the CRC of DCI format 1_1 is scrambled by a C-RNTI, MCS-C-RNTI, or CS-RNTI, the various skipping techniques described herein may be also available.

EXAMPLE 2-7

For example, if:

1) a UE monitors PDCCH according to a search space set for detection of DCI format 1_1;

2) the CRC of DCI format 1_1 is scrambled by a C-RNTI, MCS-C-RNTI, or CS-RNTI; and 3) resourceAllocation=resourceAllocationType0 and all bits of the frequency domain resource assignment field in DCI format 1_1 are equal to 0, resourceAllocation=resourceAllocationType1 and all bits of the frequency domain resource assignment field in DCI format 1_1 are equal to 1, or resourceAllocation=dynamicSwitch and all bits of the frequency domain resource assignment field in DCI format 1_1 are equal to 0 or 1, and 4) all bits of the fields, modulation and coding scheme, new data indicator and redundancy version of transport block 2 are equal to 0, then the UE can consider the DCI format 1_1 as: indicating SCell dormancy, not scheduling a PDSCH reception, or indicating a SPS PDSCH release; and for transport block 1, the UE can interpret the sequence of fields of:

1) modulation and coding scheme,
2) new data indicator,
3) redundancy version,
4) HARQ process number,
5) antenna port(s), and
6) DMRS sequence initialization as providing a bitmap to each configured SCell, in an ascending order of the SCell index, where:

a) a '0' value for a bit of the bitmap indicates an active DL BWP, provided by dormant-BWP, for the UE for a corresponding activated SCell, b) a '1' value for a bit of the bitmap indicates:

a. an active DL BWP provided by first-non-dormant-BWP-ID-for-DCI-inside-active-time for the UE for a corresponding activated SCell if a current active DL BWP is the dormant DL BWP, and b. a current active DL BWP for the UE for a corresponding activated SCell if the current active DL BWP is not the dormant DL BWP, and c) the UE sets the active DL BWP to the indicated active DL BWP.

In some embodiments, the DCI format can be DCI format 3-0 or DCI format 3-1.

In some embodiments, the DCI format can be DCI format 2-0.

In some embodiments, the DCI format can be DCI format 2-6, and the field used to reinterpret as the PDCCH monitoring behavior is the field of SCell dormancy behavior indication.

Method 2-2: Explicit Indication Information by a DCI Format

The PDCCH monitoring behavior can be indicated by a new field of a DCI format. The DCI format can include at least one of the following: 1) DCI format 0-1, 2) DCI format 1-1, 3) DCI format 0-2, 4) DCI format 1-2, 5) DCI format 3-0, 6) DCI format 3-1, 7) DCI format 2-0, or 8) DCI format 2-6. The bit width of the new field may be equal to the value of function(log $_2$(L)). function($\bullet$) represents rounding up, rounding down, or retaining the original value of "$\bullet$". L can be the number of sets of the PDCCH monitoring parameters.

L can be determined based on at least one of the following: 1) the higher layer parameter; and 2) the total number of entries in a predefined table or list.

In some embodiments, the higher layer parameter can be a Rel-17 parameter.

In some embodiments, the higher layer parameter can be used for interpreting the field in the DCI format.

If the information indicated by the DCI format is satisfied with at least one of the predefined conditions (1), (2), and (3) described in Method 2-1, this new field may not be used to indicate the PDCCH monitoring behavior function.

If the information indicated by the DCI format satisfies at least one of the predefined conditions as described in Method 2-1, then at least one of the above predefined fields as described in Method 2-1 may be used to indicate the PDCCH monitoring behavior.

For the above Method 2-1 and Method 2-2, the CRC of the DCI format indicating a PDCCH monitoring behavior may be scrambled with a new RNTI. Wherein the new RNTI is only used to scramble the CRC of the DCI indicating the information related to PDCCH monitoring behavior.

For the above Method 2-1 and Method 2-2, the DCI format can be DCI format 2_0, 2_1, 2_3, 2_4, 2_5, and/or 2_6.

Indication Bitmap

In some embodiments, the PDCCH monitoring behavior can be indicated by a DCI. In some embodiments, the PDCCH monitoring behavior can be indicated for the serving cells separately. The bitmap size can be equal to the number of groups of configured SCells where each bit of the bitmap corresponds to a group of configured SCells from the number of groups of configured SCells. A '0' value for a bit of the bitmap can indicate a first PDCCH monitoring behavior, provided by a higher layer parameter for the UE for each activated SCell in the corresponding group of configured SCells. A '1' value for a bit of the bitmap can indicate a second PDCCH monitoring behavior, provided by a higher layer parameter for the UE for each activated SCell in the corresponding group of configured SCells. The active BWP for the configured SCells may not be the BWP provided by dormant-BWP.

For 1-bit indication for each cell, there can be two sets of PDCCH monitoring parameters indicated by the DCI for a UE. For example, if the DCI is DCI format 2-6 with the CRC scrambled with PS-RNTI, then the bitmap location can be immediately after the Wake-up indication bit location. In another example, if the DCI is DCI format 2-6 with the CRC scrambled with PS-RNTI, then the bitmap location can be immediately after the SCell dormancy behavior indication bit location. In another example, if the DCI is DCI format 1-1 with the CRC scrambled with C-RNTI or MCS-C-RNTI, then the bitmap location can be immediately after the last bit location of the field of the DCI format 1-1 in Rel-16. In another example, if the DCI is DCI format 1-1 with the CRC scrambled with C-RNTI or MCS-C-RNTI, then the bitmap location can be reusing the bit location of the fields mentioned in Method 1 corresponding to DCI format 1-1.

In some embodiments, the DCI used to indicate the bitmap of PDCCH monitoring behavior can be DCI format 2-6. The bitmap indication of the SCell dormancy indication can be reinterpreted as the indication of PDCCH monitoring behavior.

Method 2-3: Implicitly Triggered by a Timer

In some embodiments, the UE can transition PDCCH monitoring behavior between the first PDCCH monitoring behavior and the second PDCCH monitoring behavior.

The PDCCH monitoring behavior transition can be triggered by an event.

In some embodiments, the event can be at least one of the following:

1) the UE detects a PDCCH;
  2) the UE does not detect a PDCCH during a timer duration;
  3) a timer is decremented to 0; or
  4) a timer is expired.

In some embodiments, the PDCCH monitoring frequency of the first PDCCH monitoring behavior can be smaller than that of the second PDCCH monitoring behavior.

The PDCCH monitoring behavior transition from the second PDCCH monitoring behavior to the first PDCCH monitoring behavior can be triggered by an event.

In some embodiments, the event can be at least one of the following:

1) the UE does not detect a PDCCH during a timer duration;
  2) a timer is decremented to 0; or
  3) a timer is expired.

In some embodiments, the timer can be configured by a higher layer parameter and applied to at least one of the following methods:

1) the timer is configured for a cell;
  2) the timer is configured for a UE;

3) the timer is configured for a band;

4) the timer is configured for a serving cell group; or 5) the timer is configured for the primary cell.

If the PDCCH monitoring behavior transition can be triggered by at least one of the above events, the UE can monitor PDCCH according to the switched PDCCH monitoring behavior in an active BWP of a cell.

In some embodiments, the cell can be at least one of the following:

1) the total activated SCells for the UE; or 2) the primary cell for the UE.

In some embodiments, the timer can be decremented by at least one of the following first type of conditions:

1) after each slot in the Active time;

2) after one millisecond in the Active time;

3) after each slot in an active DL BWP of the serving cell; or 4) after UE monitors a PDCCH carrying a specific DCI in an active DL BWP of the serving cell.

In some embodiments, the timer can be decremented by at least one of the following second type of conditions:

1) after each slot where the UE monitors PDCCH for detection of a DCI;

2) after each monitoring occasion;

3) after each PDCCH monitoring duration of a search space set configured by a higher layer parameter;

4) after each PDCCH monitoring periodicity of a search space set configured by a higher layer parameter; or 5) after each span.

In some embodiments, the timer can be decremented by at least one of the following third type of conditions:

1) after each slot or symbol where the UE decodes a DCI and does not indicated a PDCCH monitoring behavior;

2) after each slot or symbol where the UE monitors PDCCH for detection of a scheduling DCI; or 3) after each slot or symbol where the UE monitors PDCCH for detection of a DCI indicating a PDCCH monitoring behavior indication information.

In some embodiments, the UE decrements a value of the timer by one when at least one of the following conditions are satisfied:

1) after each slot/symbol in an active time;

2) after one millisecond in the active time;

3) after each slot in an active downlink (DL) bandwidth part (BWP) of a serving cell where the wireless device monitors the control channel for detection of a DCI;

4) after each monitoring occasion;

5) after each control channel monitoring duration of a search space;

6) after each span;

7) after a sub-frame; or 8) after each slot where the wireless device decodes a DCI and does not indicate a control channel skipping.

In some embodiments, the monitoring occasion can be determined according to a specific search space set.

In some embodiments, the specific search space set can be at least one of the followings:

1) type-3 CSS set; and

2) USS set.

In some embodiments, a span can be a number of consecutive symbols in a slot in which the UE is configured to monitor PDCCH candidates.

In some embodiments, a span can be three consecutive symbols in a slot in which the UE is configured to monitor PDCCH candidates.

In some embodiments, a scheduling DCI can be a DCI used for scheduling a PUSCH and/or PDSCH transmission.

In some embodiments, a scheduling DCI can be a DCI format 0-1/DCI format 1-1/DCI format 0-2/DCI format 1-2 used to indicate the information related to a PUSCH and/or PDSCH transmission.

In some embodiments, the UE does not decrement the timer value when the UE is during outside active time.

In some embodiments, the timer can be reset after the slot or symbol when at least one of the following events:

1) the UE receives a DCI;

2) the UE detects a PDCCH;

3) the UE monitors the PDCCH at the last slot of a PDCCH monitoring duration;

4) the UE meets the last slot of a PDCCH monitoring periodicity;

5) the UE switches to a PDCCH monitoring behavior different from the current PDCCH monitoring behavior.

In some embodiments, the timer can be reset after the slot or symbol when at least one of the following events:

1) the UE finishes BWP switching if a BWP switching operation is triggered by a DCI; or 2) the UE finishes a PDSCH/PUSCH transmission scheduled by the DCI if a BWP switch triggered by a DCI.

In some embodiments, when a DRX is configured, the timer can be reset after the slot or symbol when at least one of the following events:

1) a drx-onDurationtimer starts or restarts; or 2) a drx-Inactivity timer starts or restarts.

In some embodiments, if timer value is a number of slots, the timer value may need numerology conversion when numerology change is caused by a BWP switch. For example, the valuer of the timer=function $$\left( \text{timer} * \frac{2^{\mu new}}{2^{\mu old}} \right).$$

function($\bullet$) represents rounding, rounding up, rounding down, or retaining an original value of "$\bullet$". $\mu$new is numerology of new active BWP which after BWP switching. $\mu$old is numerology of old BWP which activated before BWP switching. The purposed of numerology conversion is to align the absolute time of the timer value.

In some embodiments, the value of the timer can be configured per BWP.

In some embodiments, the value of the timer can be configured per UE.

In some embodiments, the value of the timer can be configured per serving cell.

Embodiment 3: UE Behavior to Report Information Related to PDCCH Monitoring Behavior Indication Method 3-1: UE Reports Information After Detecting a DCI Format The UE may perform a reporting behavior based on at least one of the following events:

1) detect a DCI format, 2) receive an indication related to PDCCH monitoring behavior, or 3) provided a higher layer parameter.

In some embodiments, the DCI format can be at least one of the following: 1) DCI format 1-1, 2) DCI format 1-2, or 3) DCI format 3-1.

In some embodiments, the higher layer parameter can configure a specific quantity.

EXAMPLE 3-1

The reporting behavior can represent the UE procedure of reporting HARQ-ACK information. If the UE detects the DCI format being able to indicate the SCell dormancy behavior and PDCCH monitoring behavior and the higher layer parameter is pdsch-HARQ-ACK-Codebook=dynamic, the UE can generate 2 HARQ-ACK information bits,
one of the bit can represent whether the UE receives a SCell dormancy behavior or not, and
the other one of the bit represents whether the UE can receive a PDCCH monitoring behavior or not, In some embodiments, if the UE receives the information, the value of the bit can be 1. Otherwise, the value of the bit can be 0. In some embodiments, the DCI format can be at least one of the following: 1) DCI format 1-1, or 2) DCI format 1-2.

In some embodiments, the MSB of the HARQ_ACK information bits can represent the whether the UE receives a SCell dormancy behavior, and the LSB of the HARQ_ACK information bits can represent whether the UE receives a PDCCH monitoring behavior.

In some embodiments, the LSB of the HARQ_ACK information bits can represent the whether the UE receives a SCell dormancy behavior, and the MSB of the HARQ_ACK information bits can represent whether the UE receives a PDCCH monitoring behavior.

EXAMPLE 3-2

The reporting behavior can represent the UE procedure of reporting HARQ-ACK information. If the UE detects the DCI format being able to indicate one of the SCell dormancy behavior and PDCCH monitoring behavior and the higher layer parameter is pdsch-HARQ-ACK-Codebook=dynamic, the UE can generate a HARQ-ACK information bit,
the bit can represent whether the UE receives a PDCCH monitoring behavior or not, wherein if the UE receives the information, the value of the bit can be 1. Otherwise, the value of the bit can be 0. In some embodiments, the DCI format can be at least one of the following: 1) DCI format 1-1, or 2) DCI format 1-2.

A HARQ-ACK information bit value of 0 can represent a NACK while a HARQ-ACK information bit value of 1 represents an ACK.

Method 3-2: UE Reports Information to Determine the Indication Information of a Next DCI Format The UE can detect a DCI format indicating the information that is associated with the following:
1) the reported information by UE,
2) the current PDCCH monitoring behavior, and
3) the higher layer parameter.

In some embodiments, the reported information by UE can be used for the DL BWP in a cell. The reported information by UE can represent a PDCCH monitoring behavior.

In some embodiments, the PDCCH monitoring behavior can be at least one of the following:
1) a list of PDCCH monitoring parameters;
2) a group of PDCCH monitoring parameters;
3) a list of search space set;
4) a group of search space set; or
5) a search space set.

wherein the DCI format is at least one of the following: 1) DCI format 1-1, 2) DCI format 1-2, or 3) DCI format 3-1.

In some embodiments, the higher layer parameter can configure a parameter to enable a PDCCH monitoring behavior transitioning indication.

In some embodiments, the higher layer parameter can configure a set of parameters to determine the PDCCH monitoring behavior.

EXAMPLE 3-3

The UE can monitor PDCCH according to a set of PDCCH monitoring parameters. The UE can report an information including another set of PDCCH monitoring parameters. The gNB can receive the information reported by the UE and transmit a DL signaling with CRC scrambled with C-RNTI, including the indication associated with PDCCH monitoring behavior according to the reported parameter. The UE can detect the DL signaling with the CRC scrambled with C-RNTI and switches PDCCH monitoring behavior according to the information indicated by the DL signaling.

Embodiment 4: Types of DL Signaling Monitored by the UE is Applied for PDCCH Monitoring Behavior The PDCCH monitoring behavior indicated by a DCI can be provided the UE with monitoring occasions to monitor a set of PDCCH candidates.

In some embodiments, the set of PDCCH candidates can include at least one of the following:
1) the DCI with CRC scrambled with RNTIs included in Type3-CSS set; and/or
2) the DCI with CRC scrambled with RNTIs included in USS set.

In some embodiments, the set of PDCCH candidates can include at least one of the following:
1) the DCI with CRC scrambled with a C-RNTI;
2) the DCI with CRC scrambled with a SP-CSI-RNTI;
3) the DCI with CRC scrambled with a MCS-C-RNTI; or
4) the DCI with CRC scrambled with a CS-RNTI.

In some embodiments, the set of PDCCH candidates can include at least one of the following:
1) the DCI with CRC scrambled with RNTIs monitored in Active Time when a DRX is configured; or
2) the DCI with CRC scrambled with RNTIs monitored in a primary cell.

In some embodiments, the RNTIs included in a Type-3 CSS set can be a INT-RNTI, SFI-RNTI, TPC-PUSCH-RNTI, TPC-PUCCH-RNTI, TPC-SRS-RNTI, CI-RNTI, or PS-RNTI, C-RNTI, MCS-C-RNTI, or CS-RNTI(s).

In some embodiments, the RNTIs included in a USS set can be a C-RNTI, MC S-C-RNTI, SP-CSI-RNTI, CS-RNTI (s), SL-RNTI, SL-CS-RNTI, or SL-L-CS-RNTI.

Embodiment 5: Scenarios that the UE Monitors PDCCH According to the Indicated PDCCH Monitoring Behavior The UE can monitor a PDCCH with the information indicating a PDCCH monitoring behavior in a first type of serving cell. The UE may monitor the PDCCH according to the indicated PDCCH monitoring behavior in a second type of serving cell.

In some embodiments, the first type of serving cell can be at least one of the following:

1) a primary cell including a PCell, PSCell or SpCell;
2) a secondary cell including a scheduled SCell(s);

In some embodiments, the first type of serving cell can be at least one of the following:

1) a secondary cell including an activated BWP;
2) a secondary cell including a dormant BWP;

In some embodiments, the first type of serving cell can be at least one of the following:

1) the serving cell without a DRX configuration;
2) the serving cell with a DRX configuration; or
3) the serving cell with a secondary DRX group configuration.

In some embodiments, the second type of serving cell can be at least one of the following:

1) a primary cell including a PCell, PSCell or SpCell;
2) a secondary cell including the scheduled SCell(s);
3) a secondary cell including the activated DL BWP;
4) a secondary cell including the dormant BWP;

In some embodiments, the second type of serving cell can be at least one of the following:

1) the serving cell without a DRX configuration;
2) the serving cell with a DRX configuration; or
3) the serving cell with a secondary DRX group configuration.

The UE can monitor the PDCCH with the information indicating a PDCCH monitoring behavior during a first type of duration. The UE may monitor the PDCCH according to the indicated PDCCH monitoring behavior during a second type of duration.

In some embodiments, the first type of duration can be at least one of the following:

1) the DRX on duration when the DRX is configured; or
2) the Active Time when the DRX is configured;

In some embodiments, the first type of duration can be at least one of the following:

1) the Active Time when a secondary DRX group is configured;
2) the Active Time for both DRX and a secondary DRX group.

In some embodiments, the first type of duration can be at least one of the following:

1) the outside Active Time when DRX is configured;
2) the outside Active Time when a secondary DRX group is configured;
3) the outside Active Time for both DRX and a secondary DRX group; or
4) the time when DRX is not configured.

In some embodiments, the second type of duration can be at least of the following:

1) the Active Time other than the DRX on duration when DRX is configured;
2) the Active Time when DRX is configured;
3) the Active Time when a secondary DRX group is configured; or
4) the Active Time for both DRX and a secondary DRX group;

In some embodiments, the second type of duration can be at least of the following:

1) the outside Active Time when DRX is configured;
2) the outside Active Time when a secondary DRX group is configured;
3) the outside Active Time for both DRX and a secondary DRX group; or
4) the time when DRX is not configured.

Indication Bundled with Other Functions

In some embodiments, a PDCCH monitoring behavior indicated by a DCI can be triggered by at least one of the following events:

1) the minimum applicable K0 value is larger than 0;
2) the minimum applicable K2 value is larger than 0.

In some embodiments, a PDCCH monitoring behavior indicated by a DCI can be triggered by a dormant BWP indication on SCell.

In some embodiments, a PDCCH monitoring behavior indicated by a DCI can be triggered by the no-wake-up indication indicated by DCI format 2-6.

In some embodiments, a PDCCH monitoring behavior indicated by a DCI can be triggered by the PDCCH skipping behavior during a PDCCH skipping duration indicated by a DCI. As described, the PDCCH skipping behavior may mean that the UE does not monitor PDCCH during a PDCCH skipping duration.

In some embodiments, a PDCCH monitoring behavior indicated by a DCI can be triggered when the UE meets the last slot of the DRX Active Time during a DRX cycle.

In some embodiments, a PDCCH monitoring behavior indicated by a DCI can be triggered when the UE does not detect DCI format 2-6 and is not provided ps-WakeupOrNot or ps-WakeupOrNot is set to false.

In some embodiments, another PDCCH monitoring behavior indicated by a DCI can be triggered by at least one of the following events:

1) the minimum applicable K0 value is equal to 0;
2) the minimum applicable K2 value is equal to 0;
3) the active BWP of a SCell is a non-dormant BWP;
4) the wake-up indication indicated by DCI format 2-6;
5) the Active Time during a DRX cycle; or
6) the UE does not detect DCI format 2-6 and ps-WakeupOrNot is set to true.

For cross-BWP scheduling, the PDCCH monitoring behavior indication can be used for all of the active DL BWP.

For cross-carrier scheduling, the PDCCH monitoring behavior indication can be used for all of the scheduled cell.

In some embodiments, if the DCI indicates UE to do a PDCCH monitoring behavior transition, UE may perform PDCCH monitoring behavior transition after finishing BWP switching behavior.

In some embodiments, if the DCI indicates UE to do a PDCCH monitoring behavior transition, UE may perform PDCCH monitoring behavior transition after receiving a PDSCH or transmitting a PUSCH.

In some embodiments, during an application delay, UE may not expect to receive another PDCCH monitoring behavior transition indication.

In some embodiments, during an application delay, UE may not expect to receive multiple DCIs indicating PDCCH monitoring behavior transition indication with different information during a same slot.

In some embodiments, during an application delay, UE may not expect to receive multiple DCIs indicating PDCCH monitoring behavior transition indication with different information during a number of consecutive slots.

In some embodiments, the application delay can be associated with at least one of the following:

1) application delay of the minimum scheduling offset restriction;
2) BWP switching; or
3) SCell activation/deactivation.

In some embodiments, if a UE is triggered a PDCCH monitoring behavior transition during an application delay, PDCCH monitoring behavior transition triggered by a timer may not be available, and the timer may be reset.

In some embodiments, UE may not perform PDCCH monitoring behavior transition if the UE is indicated or triggered a same PDCCH monitoring behavior with the current PDCCH monitoring behavior.

In some embodiments, a UE can be indicated a first PDCCH monitoring behavior by the first method. If the UE is triggered a second PDCCH monitoring behavior by the second method during the first application delay, and the first application delay is different from the second application delay, then the UE may perform at least one of the following events:

1) the UE performs PDCCH monitoring according to the first PDCCH monitoring behavior indicated by the first method, and ignores the second PDCCH monitoring behavior indicated by the second method;

2) the UE performs PDCCH monitoring according to the second PDCCH monitoring behavior indicated by the second method;

3) the UE performs PDCCH monitoring according to the sparser PDCCH monitoring occasions between the first and the second PDCCH monitoring behavior;

4) the UE performs PDCCH monitoring according to the PDCCH monitoring behavior configured by the higher layer parameter by selecting one PDCCH monitoring behavior between the first and the second monitoring behavior;

5) the UE performs PDCCH monitoring according to the PDCCH monitoring behavior configured by the higher layer parameter by selecting one PDCCH monitoring behavior among the different set of PDCCH monitoring parameters in the configured list; or 6) the UE may ignore both the first and the second PDCCH monitoring behavior.

In some embodiments, the first method can be at least one of the following:

1) DCI indication;

2) timer triggering; or 3) higher layer parameter configuration.

In some embodiments, the second method can be at least one of the following:

1) DCI indication;

2) timer triggering; or 3) higher layer parameter configuration.

In some embodiments, the first method can be the same as the second method.

In some embodiments, the first method can be different from the second method.

In some embodiments, the first PDCCH monitoring behavior can be indicated earlier than the second PDCCH monitoring behavior.

Embodiment 6: Application Delay for the PDCCH Monitoring Behavior

If the UE is monitoring PDCCH according to a current PDCCH monitoring behavior and is provided another PDCCH monitoring behavior, the UE may monitor PDCCH according to the another PDCCH monitoring behavior after a predefined application delay.

In some implementation, the application delay can be determined by at least one of the following:

1) the remaining symbols of the slot after receiving the PDCCH indicating the PDCCH monitoring behavior;

2) the reported value from the candidate values of application delay;

3) the value of SCS of a BWP; or 4) a higher layer parameter.

In some embodiments, the candidate values of application delay can be associated with the value of SCS of a BWP.

In some embodiments, the BWP can be at least one of the following:

1) the current active BWP;

2) the BWP indicated by a DCI;

3) the BWP configured by a higher layer parameter;

4) the BWP with the largest value of SCS in a primary cell;

5) the BWP with the largest value of SCS in the scheduled secondary cell; or 6) the BWP with the largest value of SCS in both primary cell and the scheduled secondary cell.

In some embodiments, if the DCI indicates UE to do a PDCCH monitoring behavior transition, UE may perform PDCCH monitoring behavior transition after an application delay.

For Cross-Carrier Scheduling

Cross-carrier scheduling can occur when the UE receives a DCI in a scheduling cell and transmits or receives a data in a scheduled cell. The scheduling cell and the scheduled cell may be a same cell or different cells.

In some embodiments, a PDCCH monitoring behavior can be configured per BWP. A cross-carrier scheduling DCI can also indicate a PDCCH monitoring behavior. If another DCI indicates a BWP switch of the scheduling cell during an application delay, then the UE may not perform PDCCH monitoring behavior transition after the application delay.

In some embodiments, a PDCCH monitoring behavior can be configured per UE or per cell. A cross-carrier scheduling DCI can also indicate a monitoring behavior. If another DCI indicates a BWP switching of the scheduling cell during an application delay, then the UE may perform PDCCH monitoring behavior transition after the application delay.

In some embodiments, the unit of application delay can be slot or symbol.

For example, application delay=function $$\left(\text{application delay} * \frac{2^{\mu_{new}}}{2^{\mu_{old}}}\right).$$

function($\bullet$) represents rounding, rounding up, rounding down, or retaining the original value of the "$\bullet$". $\mu_{new}$ is numerology of new active BWP of the scheduling cell which after BWP switching. $\mu_{old}$ is numerology of old BWP of the scheduling cell which activated before BWP switching. The purpose of numerology conversion is to align the absolute time of the application delay value between BWPs with different value of SCS.

In some embodiments, a cross-carrier scheduling DCI can indicate a PDCCH monitoring behavior, and during an application delay, UE may not expect receive a DCI indicate a BWP switch.

Indication Restriction

If the UE is indicated a PDCCH monitoring behavior transition and a minimum scheduling offset restriction by a DCI, the UE may monitor PDCCH according to the indicated PDCCH monitoring behavior after the application delay of the minimum scheduling offset restriction. In some embodiments, the DCI can be DCI format 0-1 or DCI format 1-1.

If the UE is indicated a PDCCH monitoring behavior transition by a DCI with a DL data scheduling, the UE may not expect to monitor PDCCH according to the indicated PDCCH monitoring behavior during at least one of the following procedures:

1) the UE receives the scheduled PDSCH;

2) the UE reports the HARQ-ACK information on PUCCH corresponding to the scheduled PDSCH; or 3) the UE reports the HARQ-ACK information on PUSCH corresponding to the scheduled PDSCH.

If the UE is indicated a PDCCH monitoring behavior transition by a DCI with a DL data scheduling, the UE may not expect to monitor PDCCH according to the indicated PDCCH monitoring behavior during a timer duration.

In some embodiments, if DRX is configured, the timer can be drx-RetransmissionTimerDL If the UE is indicated a PDCCH monitoring behavior transition by a DCI with a UL data scheduling, the UE may not expect to monitor PDCCH according to the indicated PDCCH monitoring behavior during at least one of the following procedures:

1) the UE transmits the scheduled PUSCH;

2) the UE transmits the scheduled PUCCH; or 3) the UE receives the feedback information from gNB corresponding to the scheduled UL data.

If the UE is indicated a PDCCH monitoring behavior transition by a DCI with a UL data scheduling, the UE may not expect to monitor PDCCH according to the indicated PDCCH monitoring behavior during a timer duration.

In some embodiments, if DRX is configured, the timer can be drx-RetransmissionTimerUL.

The UE may not expect to perform PDCCH monitoring according to the indicated and/or triggered PDCCH monitoring behavior during the application delay corresponding to at least one of the following behaviors:

1) BWP switching indicated by a DCI;

2) BWP switching triggered by a timer;

3) cross-carrier scheduling indication;

4) cross-BWP scheduling indication;

5) minimum applicable scheduling offset indication; or

6) SCell activation/deactivation indication.

When a DRX is configured, the UE may not expect to perform PDCCH monitoring according to the indicated and/or triggered PDCCH monitoring behavior after at least one of the following:

1) the last slot and/or symbol of the Active time of a DRX cycle;

2) the last slot and/or symbol of the timer duration of drx-onDurationTimer; or 3) the last slot and/or symbol of the timer duration of drx-InactivityTimer.

When a DRX is configured, the UE may not expect to perform PDCCH monitoring according to the indicated and/or triggered PDCCH monitoring behavior during at least one of the following:

1) the timer duration of drx-RetransmissionTimerDL;

2) the timer duration of drx-RetransmissionTimerUL; or 3) the timer duration of ra-ContentionResolutionTimer.

When DRX is configured, the UE may not expect to perform PDCCH monitoring according to the indicated and/or triggered PDCCH monitoring behavior during at least one of the following:

1) the procedure: a Scheduling Request is sent on PUCCH and is pending; or 2) the procedure: a PDCCH indicating a new transmission addressed to the C-RNTI of the MAC entity has not been received after successful reception of a Random Access Response for the Random Access Preamble not selected by the MAC entity among the contention-based Random Access Preamble.

When DRX is configured, the UE may not expect to perform PDCCH monitoring according to the indicated and/or triggered PDCCH monitoring behavior during at least one of the following:

1) the timer duration of drx-HARQ-RTT-TimerDL; or 2) the timer duration of drx-HARQ-RTT-TimerUL.

In some embodiments, the indicated and/or triggered PDCCH monitoring behavior can be different from the current PDCCH monitoring behavior.

Figure 3:
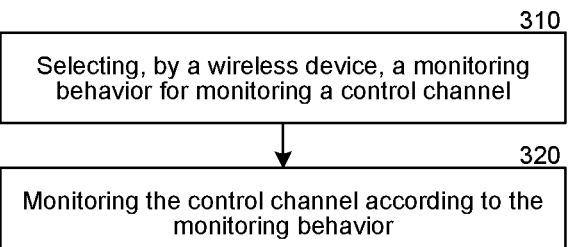
FIG. 3 illustrates an example of a process for wireless communication based on some example embodiments of the disclosed technology.

FIG. 3 illustrates an example of a process for wireless communication based on some example embodiments of the disclosed technology. [Support for final claim language will be added here]

Some embodiments may preferably incorporate the following solutions as described herein.

1. A method for wireless communication (e.g., method 300 described in FIG. 3), comprising: selecting (310), by a wireless device, a monitoring behavior for monitoring a control channel; and monitoring (320) the control channel according to the monitoring behavior.

2. The method of solution 1, wherein the monitoring behavior is selected based on monitoring configuration information received from a network device.

3. The method of any of solutions 1-2, wherein the control channel is a physical downlink control channel (PDCCH), the monitoring behavior is a PDCCH monitoring behavior, and the wireless device is a user equipment (UE).

4. The method of any of solutions 1-3, wherein the PDCCH monitoring behavior represents monitoring the PDCCH according to search space sets in a search space set group.

5. The method of any of solutions 1-4, wherein the UE monitors PDCCH according to a plurality of search space sets among the search space sets in the search space set group.

6. The method of solution 4, wherein the PDCCH monitoring behavior is indicated by a downlink control information (DCI) format which indicates information for a group of UEs.

7. The method of solution 5, wherein the PDCCH monitoring behavior is indicated by a downlink control information (DCI) format which schedules a data transmission.

8. The method of any of solutions 1 and 5, wherein the PDCCH monitoring parameters of the plurality of search space sets are satisfied with at least one of the following conditions: a PDCCH monitoring periodicity Ts is larger than a threshold; a PDCCH monitoring offset Os is larger than a threshold; a duration ks is smaller than a threshold; a number of monitoring symbols in a slot is smaller than a threshold; or a PDCCH monitoring frequency is smaller than a threshold, wherein the PDCCH monitoring frequency represents the value of ks/Ts.

9. The method of any of solutions 1-8, wherein threshold values of the PDCCH monitoring parameters of the plurality of search space sets are configured by a high layer parameter.

10. The method of any of solutions 1-9, wherein threshold values of the PDCCH monitoring parameters are indicated by a DCI.

11. The method of any of solutions 1-2, wherein the monitoring behavior is indicated by a downlink signaling, wherein the downlink signaling schedules a data transmission.

12. The method of any of solutions 1-2, wherein the monitoring behavior is indicated by a downlink signaling, wherein the downlink signaling does not schedule a data transmission.

13. The method of any of solutions 1-2, wherein the monitoring behavior is triggered by a timer configured by a high layer parameter.

14. The method of solution 11, wherein at least one field of the downlink signaling only indicates the monitoring behavior, wherein a bit width of the at least one field is determined by a high-layer parameter.

15. The method of solution 12, wherein at least one field of the downlink signaling is reused to indicate the monitoring behavior of at least one event.

16. The method of solution 15, wherein the event is at least one of the following: all bits of a frequency domain resource assignment field are set to a predefined state; or UL-SCH indicator of "0"; and/or CSI request of all zero(s), wherein the predefined state is all zeros state or all ones state.

17. The method of solution 13, wherein the timer is decremented when the wireless device detects the control channel carrying a downlink control information (DCI).

18. The method of solution 13, wherein the wireless device decrements a value of the timer by one when at least one of the following conditions are satisfied: after each slot and/or symbol in an active time; after one millisecond in the active time; after each slot in an active downlink (DL) bandwidth part (BWP) of a serving cell where the wireless device monitors the control channel for detection of a DCI; after each monitoring occasion; after each control channel monitoring duration of a search space; after each span; after a sub-frame; or after each slot where the wireless device decodes a DCI and does not indicate a control channel skipping.

19. The method of solutions 4, 7, or 18, wherein the DCI is the DCI format which indicates the PDCCH monitoring behavior.

20. The method of solutions 4, 7, or 18, wherein the DCI is the DCI format which indicates a resource information related to a data transmission.

21. The method of solution 18, wherein the wireless device changes a current monitoring behavior to another monitoring behavior when the timer is decremented to 0.

22. The method of any of solutions 11-13, wherein the wireless device monitors PDCCH according to the indicated PDCCH monitoring behavior after a number of slots X from the slot of receiving the DCI indicating a PDCCH monitoring behavior, wherein the indicated PDCCH monitoring behavior is different from the current PDCCH monitoring behavior.

23. The method of solution 22, wherein if a BWP switching behavior happens at a next slot after receiving a DCI indicating a monitoring behavior, the wireless device monitors PDCCH according to the indicated monitoring behavior after a number of slots that is equal to function($X*2^{\mu new}/2^{\mu old}$), wherein: function($\bullet$) represents rounding up or rounding down or retaining the original value of the "$\bullet$"; $\mu new$ is numerology of the active BWP of the scheduling cell after BWP switching; and $\mu old$ is numerology of the current active BWP of the scheduling cell before BWP switching.

24. The method of any of the solutions 11 or 13, wherein the data transmission scheduled by a downlink signaling is a downlink data transmission.

25. The method of solution 24, wherein the wireless device monitors PDCCH according to an indicated monitoring behavior after the downlink data transmission is received by the wireless device completely.

26. The method of any of solutions 11 or 13, wherein the data transmission scheduled by a downlink signaling is an uplink data transmission.

27. The method of solution 26, wherein the wireless device monitors PDCCH according to an indicated monitoring behavior after the uplink data transmission is completely transmitted by the wireless device.

28. The method of any of solutions 11-13, wherein if a bandwidth parts (BWP) switching behavior happens at a next slot after triggering the monitoring behavior, the wireless device monitors PDCCH according to the triggered monitoring behavior after the BWP switching behavior is completed.

29. The method of solutions 11, 12, or 14, wherein a cyclic redundancy check of the DCI is scrambled by a specific radio network temporary identifier.

30. The method of solution 12, wherein fields of the DCI reinterpreted as the information indicating a PDCCH monitoring behavior include at least one of the following: bandwidth part indicator; time domain resource assignment; downlink assignment index; modulation and coding scheme; new data indicator; redundancy version; HARQ process number; TPC command for scheduled PUSCH; antenna ports; or PTRS-DMRS association.

31. The method of solution 1, wherein the monitoring behavior switching is triggered by at least one event related to the wireless network.

32. The method of solution 31, wherein the event is associated with a power saving function of the wireless device.

33. The method of solution 31, wherein the event is associated with a timer when a DRX is configured.

34. The method of any of solutions 1-2, wherein the wireless device does not expect to perform control channel monitoring behavior transition during at least one of the following events: the last slot and/or symbol of the timer duration of drx-RetransmissionTimerDL; the last slot and/or symbol of the timer duration of drx-RetransmissionTimerUL; the last slot and/or symbol of the timer duration of ra-ContentionResolutionTimer; the last slot and/or symbol of the timer duration of drx-HARQ-RTT-TimerDL; the last slot and/or/symbol of the timer duration of drx-HARQ-RTT-TimerUL.

35. The method of any of solutions 1-2, wherein the wireless device does not expect to receive multiple downlink control information (DCIs) indicating control channel monitoring behavior transition indication with different information during a number of consecutive slots.

36. The method of any of solutions 1-2, wherein the wireless device does not perform control channel monitoring behavior transition if the wireless device is indicated.

37. The method of any of solutions 1-2, wherein the wireless device does not perform control channel monitoring behavior transition if the wireless device triggers a same control channel monitoring behavior with a current control channel monitoring behavior.

38. The method of any of solutions 1-2, wherein the wireless device performs a report behavior if the control channel monitoring behavior is indicated by a downlink control information (DCI) scheduled with a downlink data.

39. The method of any of solutions 1-2, wherein the wireless device performs a report behavior if the control channel monitoring behavior is indicated by a downlink control information (DCI) scheduled with a secondary cell dormancy behavior indication.

Figure 4:
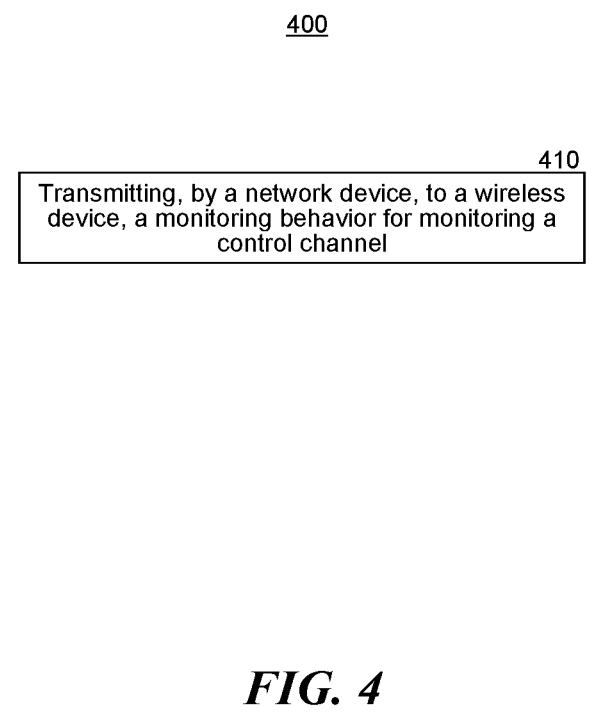

40. A method for wireless communication (e.g., method 400 described in FIG. 4), comprising transmitting (410), by a network device, to a wireless device, a monitoring behavior for monitoring a control channel.

41. The method of solution 40, wherein the monitoring behavior is indicated by monitoring configuration information transmitted by a network device.

42. The method of any of solutions 40-41, wherein the control channel is a physical downlink control channel (PDCCH), the monitoring behavior is a PDCCH monitoring behavior, and the wireless device is a user equipment (UE).

43. The method of any of solutions 40-42, wherein the PDCCH monitoring behavior represents monitoring the PDCCH according to search space sets in a search space set group.

44. The method of solution 43, wherein the PDCCH monitoring behavior is indicated by a downlink control information (DCI) format which indicates information for a group of UEs.

45. The method of solution 43, wherein the PDCCH monitoring behavior is indicated by a downlink control information (DCI) format which schedules a data transmission.

46. The method of solution 40, wherein the PDCCH monitoring parameters of the plurality of search space sets satisfy at least one of the following conditions: a PDCCH monitoring periodicity Ts is larger than a threshold; a PDCCH monitoring offset Os is larger than a threshold; a duration ks is smaller than a threshold; a number of monitoring symbols in a slot is smaller than a threshold; or a PDCCH monitoring frequency is smaller than a threshold, wherein the PDCCH monitoring frequency represents the value of ks/Ts.

47. The method of any of solutions 40-46, wherein threshold values of the PDCCH monitoring parameters of the plurality of search space sets are configured by a high layer parameter.

48. The method of any of solutions 40-47, wherein threshold values of the PDCCH monitoring parameters are indicated by a DCI.

49. The method of any of solutions 40-41, wherein the monitoring behavior is indicated by a downlink signaling, wherein the downlink signaling schedules a data transmission.

50. The method of any of solutions 40-41, wherein the monitoring behavior is indicated by a downlink signaling, wherein the downlink signaling does not schedule a data transmission.

51. The method of any of solutions 40-41, wherein the monitoring behavior is triggered by a timer configured by a high layer parameter.

52. The method of solution 49, wherein at least one field of the downlink signaling only indicates the monitoring behavior, wherein a bit width of the at least one field is determined by a high-layer parameter.

53. The method of solution 50, wherein at least one field of the downlink signaling is reused to indicate the monitoring behavior of at least one event.

54. The method of solution 53, wherein the event is at least one of the following: all bits of a frequency domain resource assignment field are set to a predefined state; or UL-SCH indicator of "0"; and/or CSI request of all zero(s); wherein the predefined state is all zeros state or all ones state.

55. The method of solution 51, wherein the timer is decremented when the wireless device detects the control channel carrying a downlink control information (DCI).

56. The method of solutions 43 or 46, wherein the DCI is the DCI format which indicates the PDCCH monitoring behavior.

57. The method of solutions 43 or 46, wherein the DCI is the DCI format which indicates a resource information related to a data transmission.

58. The method of any of the solutions 49-51, wherein the data transmission scheduled by a downlink signaling is a downlink data transmission.

59. The method of any of solutions 49-51, wherein the data transmission scheduled by a downlink signaling is an uplink data transmission.

60. The method of any of solutions 49-51, wherein if a bandwidth parts (BWP) switching behavior happens at a next slot after triggering the monitoring behavior, the wireless device monitors PDCCH according to the triggered monitoring behavior after the BWP switching behavior is completed.

61. The method of solutions 49, 50, or 52, wherein a cyclic redundancy check of the DCI is scrambled by a specific radio network temporary identifier.

62. The method of solutions 50, wherein fields of the DCI reinterpreted as the information indicating a PDCCH monitoring behavior include at least one of the following: bandwidth part indicator; time domain resource assignment; downlink assignment index; modulation and coding scheme; new data indicator; redundancy version; HARQ process number; TPC command for scheduled PUSCH; antenna ports; or PTRS-DMRS association.

63. The method of solution 40, wherein the monitoring behavior switching is triggered by at least one of the events.

64. The method of solution 63, wherein the event is associated with a power saving function of the wireless device.

65. The method of solution 63, wherein the event is associated with a timer when a DRX is configured.

In some embodiments, a network device can receive from a wireless device a HARQ-ACK information related to a monitoring behavior indication.

In some embodiments, a network device can receive from a wireless device a UE assistance information related to a monitoring behavior indication.

In some embodiments, a network device can receive from a wireless device an application delay related to the monitoring behavior transition.

66. An apparatus for wireless communication, comprising a memory and a processor, wherein the processor reads code from the memory and implements a method recited in any of solutions 1 to 65.

67. A computer readable program storage medium having code stored thereon, the code, when executed by a processor, causing the processor to implement a method recited in any of solutions 1 to 65.

Figure 5:
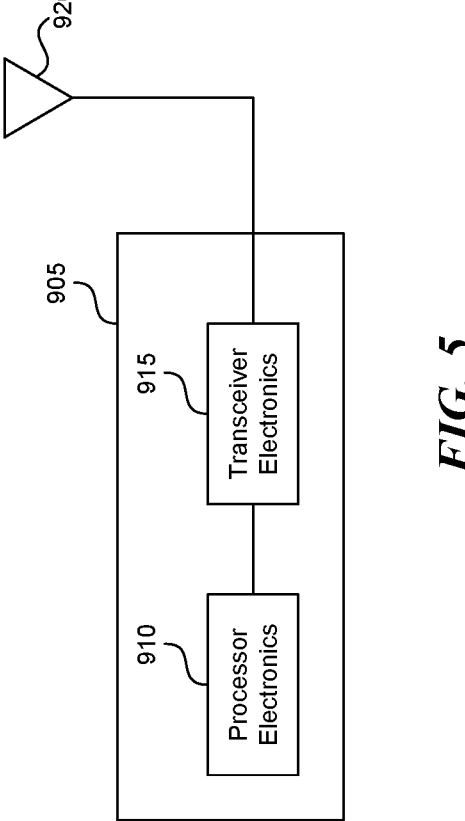
FIG. 5 is a block diagram representation of a portion of an apparatus that can be used to implement methods and/or techniques of the presently disclosed technology.

FIG. 5 is a block diagram representation of a portion of an apparatus, in accordance with some embodiments of the presently disclosed technology. An apparatus 905, such as a base station or a wireless device (or UE), can include processor electronics 910 such as a microprocessor that implements one or more of the techniques presented in this document. The apparatus 905 can include transceiver electronics 915 to send and/or receive wireless signals over one or more communication interfaces such as antenna(s) 920. The apparatus 905 can include other communication interfaces for transmitting and receiving data. Apparatus 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the apparatus 905.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:

receiving, at a wireless device, a DCI that indicates a second monitoring behavior, during an application delay subsequent to a timer expiring event for triggering a first monitoring behavior, wherein the first monitoring behavior monitors a physical downlink control channel (PDCCH) according to a search space set group that comprises a plurality of search space sets and the second monitoring behavior monitors the PDCCH according to the search space set group or skips PDCCH monitoring during a PDCCH skipping duration; and monitoring, by the wireless device, the physical downlink control channel (PDCCH) using the first monitoring behavior subsequent to the application delay from the timer expiring event, wherein the wireless device ignores the second monitoring behavior indicated by the DCI based at least on the second monitoring behavior being associated with a second application delay different than the application delay subsequent to the timer expiring event.

2. The method of claim 1, wherein the second monitoring behavior comprises at least one of: switching between different search space sets, switching between different groups of search space sets, or switching between different lists of parameters related to PDCCH monitoring.

3. The method of claim 1, wherein the DCI indicates an index of a search space set subgroup among search space set subgroups in the search space set group.

4. The method of claim 3, wherein the wireless device assumes that a lowest index of the search space set subgroup is used to determine a subsequent PDCCH monitoring occasion.

5. The method of claim 1, wherein the DCI indicates at least one of a threshold for a duration Ts, a threshold for a periodicity ks, a threshold for PDCCH monitoring offset Os, a threshold for a number of monitoring symbols in a slot Nsymb, or a threshold for a PDCCH monitoring frequency fs, and wherein the second monitoring behavior comprises at least one of:

a duration is smaller than the threshold for the duration Ts;

a periodicity is greater than the threshold for the periodicity ks;

a PDCCH monitoring offset is greater than the threshold for the PDCCH monitoring offset Os;

a number of monitoring symbols in a slot is smaller than the threshold for the number of monitoring symbols in a slot Nsymb; or a PDCCH monitoring frequency is smaller than the threshold for the PDCCH monitoring frequency fs.

6. The method of claim 1, wherein the timer expiring event is based on a timer configured by a high layer parameter, and wherein the method further comprises at least one of:

resetting the timer after a slot or symbol when the wireless device receives the DCI or detects the PDCCH; and decrementing the timer after each slot in an active DL BWP of a serving cell.

7. The method of claim 1, wherein the first monitoring behavior provides the wireless device with monitoring occasions to monitor a set of PDCCH candidates, wherein the set of PDCCH candidates includes at least one of the following: a DCI with CRC scrambled with a C-RNTI, a DCI with CRC scrambled with a SP-CSI-RNTI, a DCI with CRC scrambled with an MCS-C-RNTI, or a DCI with CRC scrambled with a CS-RNTI.

8. The method of claim 1, wherein the wireless device performs a report behavior based on the first monitoring behavior.

9. A method for wireless communication, comprising:

transmitting, by a network device, to a wireless device, a DCI that indicates a second monitoring behavior for monitoring a control channel, during an application delay subsequent to a timer expiring event at the wireless device for triggering a first monitoring behavior, wherein the first monitoring behavior monitors the control channel according to a search space set group that comprises a plurality of search space sets and the second monitoring behavior monitors the control channel according to the search space set group or skips monitoring during a skipping duration; and receiving, by the network device, from the wireless device, a report that includes a set of monitoring parameters related to the wireless device monitoring the control channel, the set of monitoring parameters being associated with the first monitoring behavior based on the wireless device ignoring the second monitoring behavior indicated by the DCI due to the second monitoring behavior being associated with a second application delay different than the application delay subsequent to the timer expiring event.

10. The method of claim 9, wherein the control channel is a physical downlink control channel (PDCCH), the second monitoring behavior is a PDCCH monitoring behavior, and the wireless device is a user equipment (UE).

11. The method of claim 10, wherein the PDCCH monitoring behavior represents monitoring the PDCCH according to the search space sets in the search space set group.

12. The method of claim 10, wherein the DCI that indicates the PDCCH monitoring behavior schedules a data transmission.

13. The method of claim 10, wherein at least one field of the DCI indicates the second monitoring behavior, and wherein a bit width of the at least one field is determined by a high-layer parameter.

14. The method of claim 10, wherein at least one field of the DCI is reused to indicate the second monitoring behavior for at least one event.

15. The method of claim 14, wherein the event is at least one of the following:

all bits of a frequency domain resource assignment field are set to a predefined state; and/or all bits of the fields, modulation and coding scheme, new data indicator and redundancy version of transport block 2, are set to predefined states; or UL-SCH indicator of "0"; and/or CSI request of all zero(s);

wherein the predefined state is all zeros state or all ones state.

16. An apparatus for wireless communication, comprising a memory and processor electronics, wherein the processor electronics reads code from the memory and causes the apparatus to:

receive a DCI that indicates a second monitoring behavior, during an application delay subsequent to a timer expiring event for triggering a first monitoring behavior, wherein the first monitoring behavior monitors a physical downlink control channel (PDCCH) according to a search space set group that comprises a plurality of search space sets and the second monitoring behavior monitors the PDCCH according to the search space set group or skips PDCCH monitoring during a PDCCH skipping duration; and monitor the physical downlink control channel (PDCCH) using the first monitoring behavior subsequent to the application delay from the timer expiring event, based on ignoring the second monitoring behavior indicated by the DCI due to the second monitoring behavior being associated with a second application delay different than the application delay from the timer expiring event.

17. An apparatus for wireless communication, comprising a memory and processor electronics, wherein the processor electronics reads code from the memory and causes the apparatus to:

transmit, to a wireless device, a DCI that indicates a second monitoring behavior for monitoring a control channel, during an application delay subsequent to a timer expiring event at the wireless device for triggering a first monitoring behavior, wherein the first monitoring behavior monitors the control channel according to a search space set group that comprises a plurality of search space sets and the second monitoring behavior monitors the control channel according to the search space set group or skips monitoring during a skipping duration; and receive, from the wireless device, a report that includes a set of monitoring parameters related to the wireless device monitoring the control channel, the set of monitoring parameters being associated with the first monitoring behavior based on the wireless device ignoring the second monitoring behavior indicated by the DCI due to the second monitoring behavior being associated with a second application delay different than the application delay subsequent to the timer expiring event.

* * * * *